(12) United States Patent
Davidson et al.

(10) Patent No.: US 10,552,886 B2
(45) Date of Patent: Feb. 4, 2020

(54) METHODS AND APPARATUS FOR MERCHANDISE GENERATION INCLUDING AN IMAGE

(71) Applicant: Yearbooker, Inc., New York, NY (US)

(72) Inventors: Robert Davidson, New York, NY (US); Fanny Chung Davidson, New York, NY (US)

(73) Assignee: Yearbooker, Inc., New York, NY (US)

( * ) Notice: Subject to any disclaimer, the term of this patent is extended or adjusted under 35 U.S.C. 154(b) by 0 days.

(21) Appl. No.: 16/256,693

(22) Filed: Jan. 24, 2019

(65) Prior Publication Data

US 2019/0156391 A1    May 23, 2019

Related U.S. Application Data

(63) Continuation-in-part of application No. 16/102,219, filed on Aug. 13, 2018, and a continuation-in-part of application No. 15/484,954, filed on Apr. 11, 2017, which is a continuation-in-part of application No. 14/535,270, filed on Nov. 6, 2014, now Pat. No. 9,030,496.

(60) Provisional application No. 62/621,357, filed on Jan. 24, 2018, provisional application No. 62/320,663, filed on Apr. 11, 2016, provisional application No. 62/012,386, filed on Jun. 15, 2014, provisional application No. 61/971,493, filed on Mar. 27, 2014, provisional application No. 61/901,042, filed on Nov. 7, 2013.

(51) Int. Cl.
*G06Q 30/06* (2012.01)
*G06F 3/0482* (2013.01)
*G06F 3/0486* (2013.01)
*G06F 3/0488* (2013.01)
*H04L 29/08* (2006.01)

(52) U.S. Cl.
CPC ....... *G06Q 30/0621* (2013.01); *G06F 3/0482* (2013.01); *G06F 3/0486* (2013.01); *G06F 3/0488* (2013.01); *H04L 67/10* (2013.01)

(58) Field of Classification Search
CPC . G06F 3/0486; G06F 3/0488; G06Q 30/0621; H04L 67/10
See application file for complete search history.

(56) References Cited

U.S. PATENT DOCUMENTS

| 6,738,154 | B1 | 5/2004 | Venable |
| 8,862,995 | B1 | 10/2014 | Kuhne et al. |
| 9,030,496 | B1 | 5/2015 | Davidson et al. |
| 2002/0122067 | A1 | 9/2002 | Geigel et al. |
| 2005/0030315 | A1 | 2/2005 | Cohen et al. |

(Continued)

FOREIGN PATENT DOCUMENTS

WO    WO-2013033664 A2 *  3/2013  ............. G06Q 10/10

*Primary Examiner* — Nicholas Klicos
(74) *Attorney, Agent, or Firm* — Joseph P. Kincart; Rogers Towers, P.A.

(57) ABSTRACT

The present disclosure provides methods and an apparatus for quickly and easily facilitating the creation of certain merchandise based on a user selection of at least one of a collection of images. It is contemplated that the user can browse the selection of images, choose a desired image or images, and quickly convert the image or images into, for example, photo reprints, photo books, coffee mugs, or wall calendars.

9 Claims, 6 Drawing Sheets

(56) References Cited

U.S. PATENT DOCUMENTS

| | | | |
|---|---|---|---|
| 2005/0134939 A1* | 6/2005 | Ikeda | H04N 1/00448 358/471 |
| 2006/0047547 A1* | 3/2006 | Ekker | G06Q 10/0631 705/7.12 |
| 2010/0070572 A1 | 3/2010 | Olson et al. | |
| 2012/0179571 A1* | 7/2012 | Grosso, III | G06Q 30/0621 705/26.5 |
| 2012/0233253 A1 | 9/2012 | Ricci | |
| 2012/0239528 A1* | 9/2012 | Nakagawa | G06Q 10/087 705/26.25 |
| 2012/0278391 A1 | 11/2012 | Olson et al. | |
| 2012/0331371 A1 | 12/2012 | Larson et al. | |
| 2013/0080897 A1 | 3/2013 | Han et al. | |
| 2014/0080456 A1 | 3/2014 | Nunn et al. | |
| 2014/0181715 A1 | 6/2014 | Axelrod et al. | |
| 2015/0143256 A1 | 5/2015 | Panchawagh-Jain et al. | |

\* cited by examiner

METHODS AND APPARATUS FOR MERCHANDISE GENERATION INCLUDING AN IMAGE

CROSS-REFERENCE TO RELATED APPLICATIONS

The present application claims priority to Provisional Patent Application No. 62/621,357, filed on Jan. 24, 2018 and entitled METHODS AND APPARATUS FOR MERCHANDISE GENERATION INCLUDING AN IMAGE; and claims priority as a Continuation in Part Application to U.S. patent application Ser. No. 15/484,954, entitled Methods and Apparatus for Dynamic Image Entries filed Apr. 11, 2017, which in turn claims the benefit of U.S. Provisional Patent Application Ser. No. 62/320,663 entitled Methods and Apparatus for Interactive Memory Book with Motion Based Annotations filed Apr. 11, 2016. The U.S. patent application Ser. No. 15/484,954 claims priority as a Continuation in Part Application to U.S. patent application Ser. No. 14/535,270 entitled Methods for and Apparatus for Interactive School Yearbook now U.S. Pat. No. 9,030,496 issued May 12, 2015; which in turn claims the benefit of U.S. Provisional Patent Application Ser. No. 62/012,386 entitled Methods for and Apparatus for Interactive School Yearbook filed Jun. 15, 2014; and also claims the benefit of U.S. Provisional Patent Application Ser. No. 61/971,493 entitled Methods for and Apparatus for Interactive School Yearbook filed Mar. 27, 2014; and also claims the benefit of U.S. Provisional Patent Application Ser. No. 61/901,042 entitled Methods for and Apparatus for Interactive School Yearbook filed Nov. 7, 2013. The contents of these Patent Applications are relied upon and incorporated herein by reference.

FIELD OF THE DISCLOSURE

The present disclosure relates to methods and an apparatus for quickly and easily creating customized merchandise items, such as t-shirts, photo reprints, photo books, mugs, and calendars, based on static images and.

BACKGROUND OF THE DISCLOSURE

Websites allowing a user to generate merchandise, such as t-shirts, mugs, and calendars, from certain images have existed for many years. However, their use is inconvenient. The user must either select an image from a pre-populated list of images the website owner has the rights to use, or upload his own.

The user seeking to create merchandise based off his own image must go through several time-consuming steps, such as locating the desired image, ensuring he has the rights to create merchandise based off the image, editing the image to meet his needs, finding a website that creates the specific type of merchandise he wants, and uploading the image to the website.

User uploads pose a potential legal problem for the website owner as well. For example, if the user chooses the Coca-Cola® logo as his image and begins selling Coca-Cola® t-shirts from the website, then the website could be liable for contributory trademark infringement. Additionally, if the user uploads a picture of someone else's child, that child's parents may be able to sue the website owner for misappropriating their child's likeness.

SUMMARY OF THE DISCLOSURE

Accordingly, the present invention provides a quick, easy method for the viewer of an image stored remotely or on the viewer's device to generate merchandise, such as a t-shirt, mug, photo reprint, photo book, Yearbooker, a hat and a calendar, and to place a chosen image content in a position upon a merchandise item via simple drag and drop of an image across a user interface to a selected Merchandise Item. In some embodiments, a user identification will additionally authenticate the user's rights to generate merchandise including a selected image.

A system of one or more computers can be configured to perform particular operations or actions by virtue of having software, firmware, hardware, or a combination of them installed on the system that in operation causes the system to perform specific actions, such as receive sensor input, execute method steps based upon the sensor input. One or more computer programs can be configured to perform particular operations or actions by virtue of including instructions that, when executed by data processing apparatus, cause the apparatus to perform the actions.

BRIEF DESCRIPTION OF THE DRAWINGS

The accompanying drawings, that are incorporated in and constitute a part of this specification, illustrate several embodiments of the disclosure and, together with the description, serve to explain the principles of the disclosure.

DETAILED DESCRIPTION

The present disclosure provides generally for an apparatus and method for ordering image-based Merchandise.

This application cross-references and incorporates by reference the disclosure found in application Ser. No. 15/099,841.

In the following sections, detailed descriptions of examples and methods of the disclosure will be given. The description of both preferred and alternative examples though through are exemplary only, and it is understood that to those skilled in the art that variations, modifications, and alterations may be apparent. It is therefore to be understood that the examples do not limit the broadness of the aspects of the underlying disclosure as defined by the claims.

Glossary

Merchandise, as used herein, refers to one or more of any number of potentially desirable items that a user may want to generate from an image. Merchandise includes, but is not limited to, hats, t-shirts, coffee mugs, calendars, photo books, and wall art.

Device, as used herein, refers to any smart device (comprising a controller and a storage) or computer, having a processor, memory, and network access device. Device includes, but is not limited to, smart phones, cellular phones, desktop computers, laptop computers, and tablet computers.

Figure 1A:
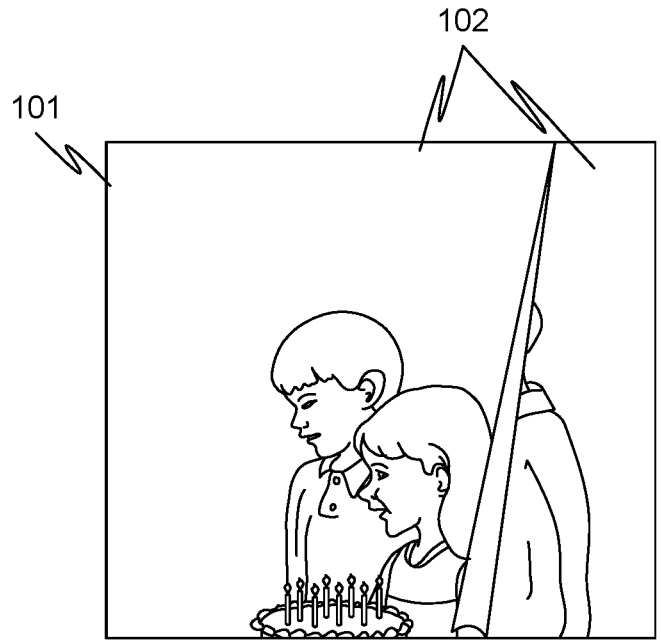
FIGS. 1A-4 illustrate an exemplary embodiment of the method and apparatus for quickly ordering Merchandise (as defined herein).

Referring now to FIG. 1A, an image display application 101 appears on the user's Device. The image display application 101 allows a user to view one or more images 102. In some embodiments, the one or more images will include a memory or photo book memorializing an event. Events may include a life event, such as a birthday, anniversary, wedding, christening, photo session, bar mitzvah or bat mitzvah. Other embodiments include a collection of images included in a school yearbook. This disclosure incorporates by reference U.S. Pat. No. 9,030,496 for disclosure describing a source of image data.

Figure 1B:
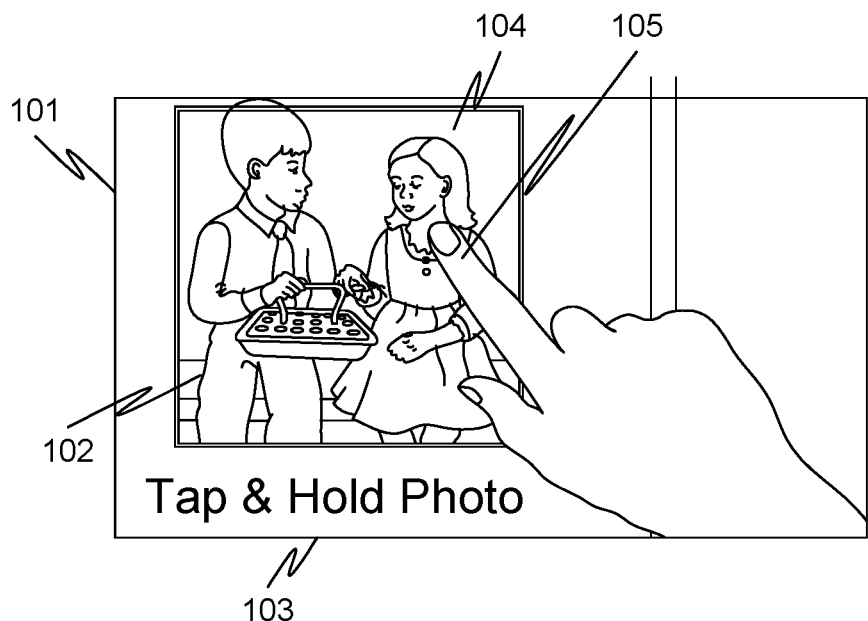

Referring now to FIG. 1B, when an image 102 appears on the image display application 101, the image display application 101 may cause instructions 103 for selecting a particular image to appear on the Device's display. In a preferred embodiment, this instruction 103 comprises the phrase "Tap & Hold photo." In this preferred embodiment, the Device also comprises a capacitive screen 104 that displays the image 102 may be responsive to a user action, such as a user providing a source of body heat (i.e. the user's finger) 105, thus allowing the user to carry out instruction 103 to select the particular image. In an alternative embodiment, the instructions 103 prompt the user to use a computer mouse to click the particular image 102. The image 102 may be associated with spatial coordinates, such as Cartesian Coordinates or Polar Coordinates.

Figure 2A:
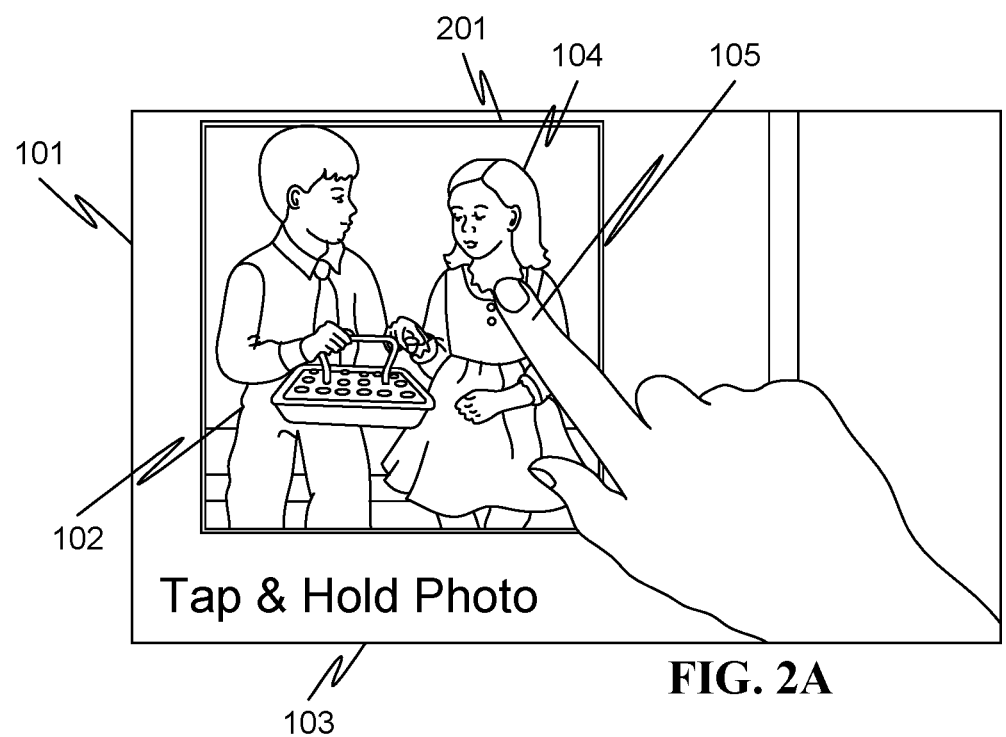

Referring now to FIG. 2A, once the user indicates a selection of an image 102 by following instruction 103, the image display application 101 applies a visual indication of selection 201 to the selected image 102 or a portion of selected image 102 by, for example, at least one of: surrounding the image 102 or portion of image 102 with a colored border; causing the image 102 or portion of image 102 to wiggle; causing image 102 or portion of image 102 to be highlighted or glow; and the like.

Figure 2B:
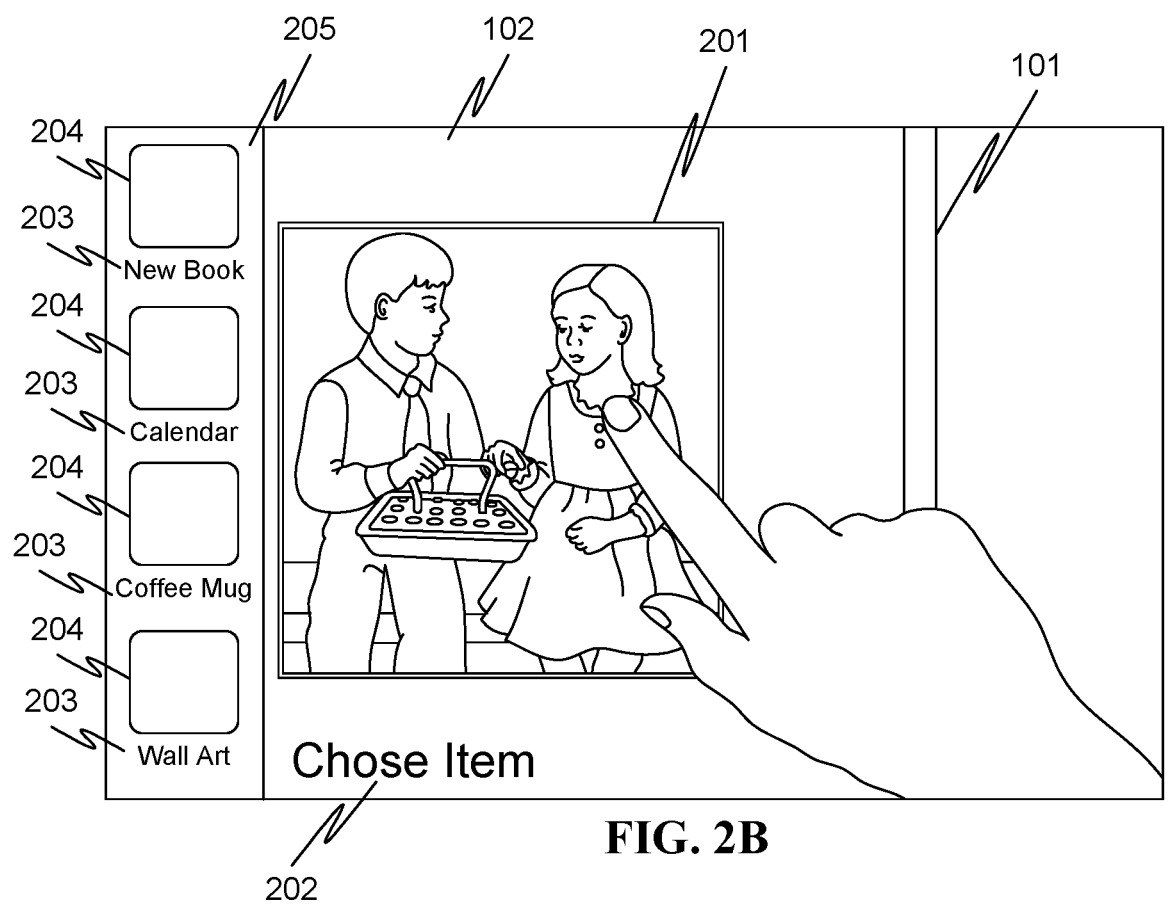

Referring now to FIG. 2B, once the image 102 is selected 201, the image display application 101 opens a side menu 205. Side menu 205 comprises one or more Merchandise options 203, and off-shade, picture frame-shaped boxes 204. The image display application 101 displays instructions 202 to instruct the user on how to choose the desired Merchandise.

Figure 3A:
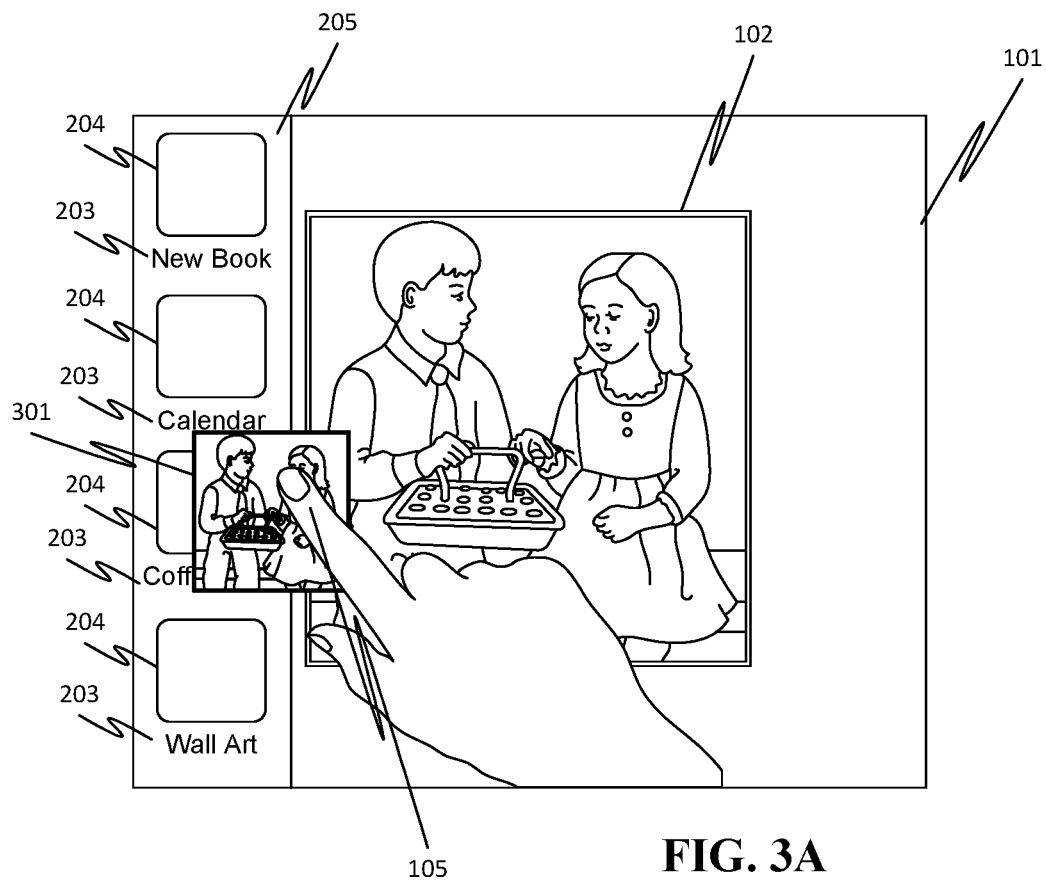

Referring now to FIG. 3A, the user can select the particular desired article of Merchandise by dragging and dropping the chosen image 102 using a user input device, such as a computer mouse or the user's finger 105, to the picture frame-shaped box 204 corresponding to the user's chosen article of Merchandise. FIG. 3A demonstrates the user creating a coffee mug from image 102. In some embodiments, as the user moves the selected image 102, it is automatically resized to fit the picture frame-shaped box 204. The resized image of the picture may be displayed on the article of merchandise such that the user may view a representation of an item to be generated with the image of the picture 301.

Figure 3B:
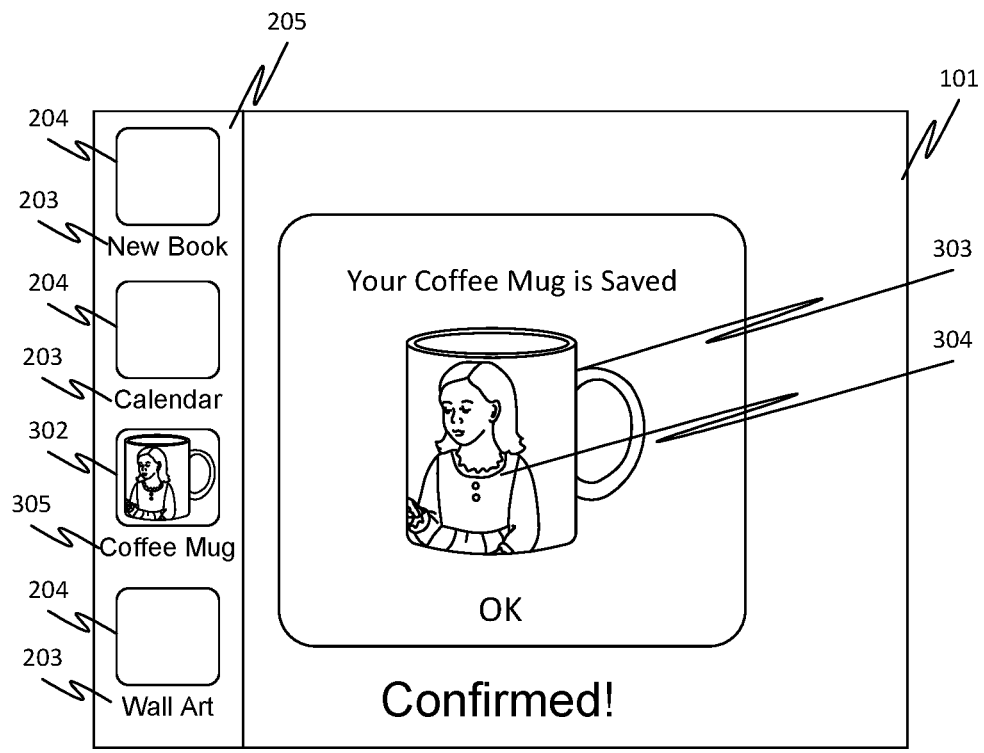

Referring now to FIG. 3B, in some embodiments, following the user selection of a particular desired article of Merchandise, the image display application 101 displays at least one preview 304 of the desired article of Merchandise, 305, as it would appear with the chosen image 302, 304. By way of non-limiting example, a preview 304 of a customized coffee mug may comprise the chosen image 102 wrapped around the generally cylindrical body of the coffee mug 303. In some embodiments, the image display application presents users with additional options for finalizing the Merchandise, such as, by way on non-limiting example, cropping the image, rotating the image, resizing the image or applying an annotation to the image.

In some embodiments, a set of Cartesian Coordinates may be associated with one or more segregated spatial areas on a Merchandise item. The segregated spatial areas may designate a position for a selected image to reside on a Merchandise item. The invention includes the provision of a user interface that allows a user to select an image, such as for example via a designation of an X,Y coordinate or other set of coordinates (e.g. Cartesian Coordinate or Polar Coordinate), and to additionally select a merchandise item via the use of coordinates, such as Cartesian or Polar coordinates designating a position within the user interface associated with the Merchandise item. Finally, a third set of coordinates, such as Cartesian Coordinates or Polar Coordinates, may be used to designate a position to generate a copy of the selected upon the Merchandise item.

Figure 4:
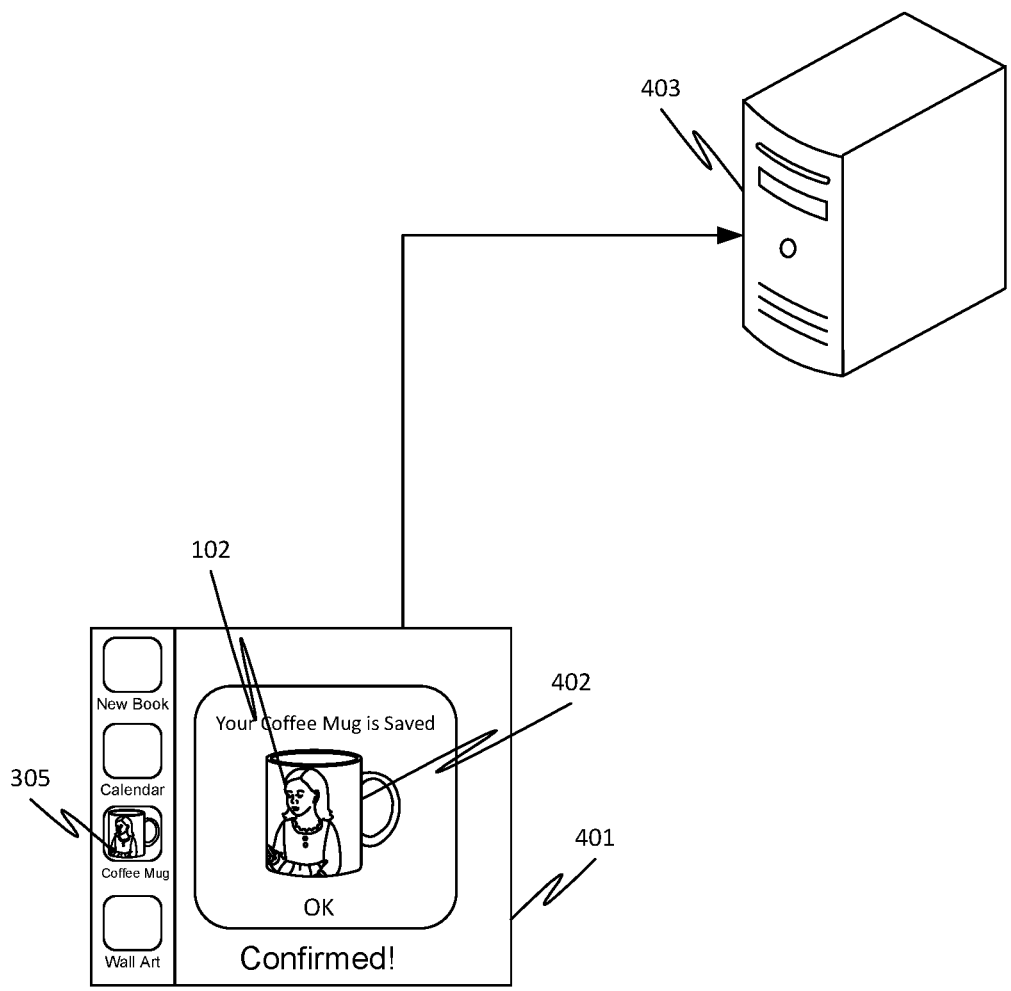

Referring now to FIG. 4, the user's Device 401 transmits through its network access device by wireless network, LTE cellular data connection, internet protocol, or other data transfer protocol, the user's order 402 to a remote server 403, for processing and creation of the actual Merchandise. The user's order comprises one or more images 102 and a chosen article of Merchandise 305, and may in some embodiments also comprise any alterations to the one or more images 102 provided by the user. In some embodiments, the photo may be exported to Merchandise site with the ability to include image 102 in an article of Merchandise. In some embodiments, image 102 may be transmitted to a photographer. In some embodiments, a photographer may capture image 102 and receive a royalty from any article of Merchandise sold based on image 102. In some embodiments, use fees may be applicable for reproduction. Device 401 may be in logical connection with an appropriate digital rights management apparatus to give or receive appropriate rights permissions in image 102.

In some embodiments, the user will have access only to images 102 for which the user has permission to generate Merchandise. In other embodiments, the user will have access to a larger set of images, and the user's permission to use a given image in generating Merchandise will be checked after the user has selected the image. For a collection of images, such as a memory book or yearbook, a user may receive a third party authorization (such as from an event organizer or a school representative). The third party authorization is additionally transmitted to a manufacturer thereby authorizing the generation of the customized article of merchandise.

Figure 5:
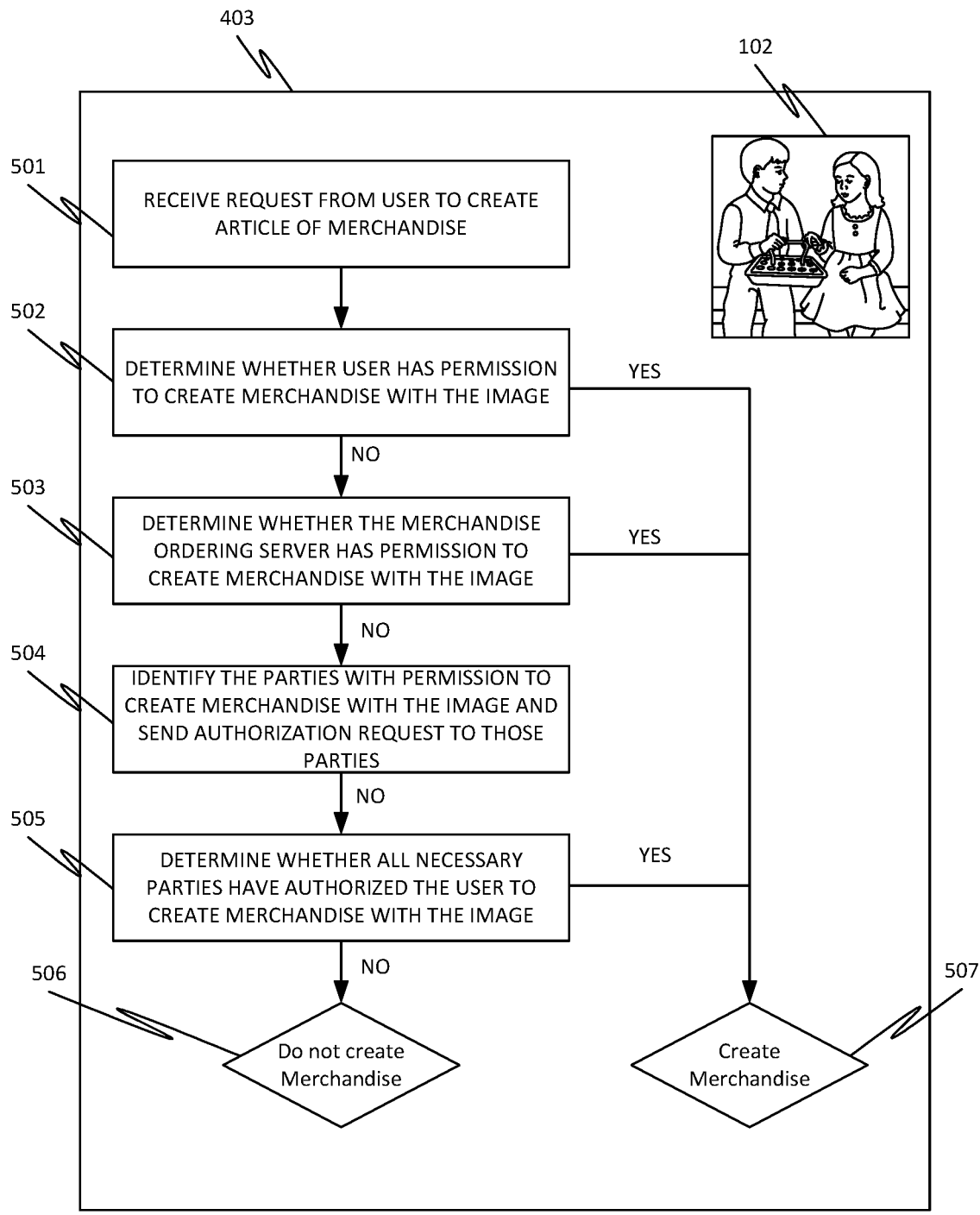
FIG. 5 illustrates an exemplary embodiment of a method for authenticating the rights of the user requesting Merchandise.

Accordingly, referring now to FIG. 5, there may be numerous methods relating to the verification of permission to use certain images. These methods may share some or all of a select set of common steps. In FIG. 5, these common steps may be depicted. The server 403 will receive 501 the desired at least one image 102.

The server 403 can then determine 502 whether the user has permission to create Merchandise with the at least one image 102. There may be many methods for verifying that the user has permission to create Merchandise with the at least one image 102. These methods may include metadata verification that the image is a picture taken with a camera corresponding to the user's Device; use of facial recognition software to match the subject of the at least one image 102 with on-file photographs of the user; or an affirmation by the user that he has the right to generate Merchandise with the at least one image 102. If it is verified that the user has permission to create Merchandise with the at least one image 102, then the order will be processed 507.

If the server cannot determine 502 that the user has permission to create Merchandise with the at least one image 102, then the server may verify 503 that the owner of the server has permission to create Merchandise with the at least one image 102. For example, image hosting service Instagram requires that its users grant Instagram a royalty-free license to use in connection with advertising any content the users upload to Instagram. See Terms of Use, INSTAGRAM, http://help.instagram.com/478745558852511 (last updated Jan. 19, 2013). If the server owner has a similar license with respect to the at least one image 102, then the order will be processed 507.

If neither the user nor the server owner has permission to create Merchandise with the at least one image 102, then the server will 504 identify the other party whose permission is needed to use the at least one image 102. The other party may be at least one of: the photographer of the at least one image 102, a person depicted in the at least one image 102, or the parent of the person depicted in the at least image 102 if the person is a minor. There may be numerous methods to identify the other party whose permission is needed, including, but not limited to, facial recognition software or use of user- or computer-inputted metatags on the at least one image 102 itself.

The server will then seek authorization 505 from the other party to create Merchandise with the at least one image 102. There may be numerous methods to seek authorization from the other party, including, but not limited to, automatically generating an email, or if the other party also has the image display software 101 on a Device owned by her, transmitting a signal to the image display software 101 on the other party's Device that prompts the other party to give or decline authorization. If the other party grants authorization to create Merchandise with the at least one image 102, then the order will be processed 507. If the other party does not grant authorization, then the order will be deleted 506, and the server 403 will transmit a cancellation message to the user's Device. Server 403 may also be operative to assemble a photobook based on the at least one image 102 to send to third parties. The third parties may also create their own Merchandise based on the at least one image 102. In some embodiments, the third parties may receive compensation for sales for such Merchandise.

Figure 6:
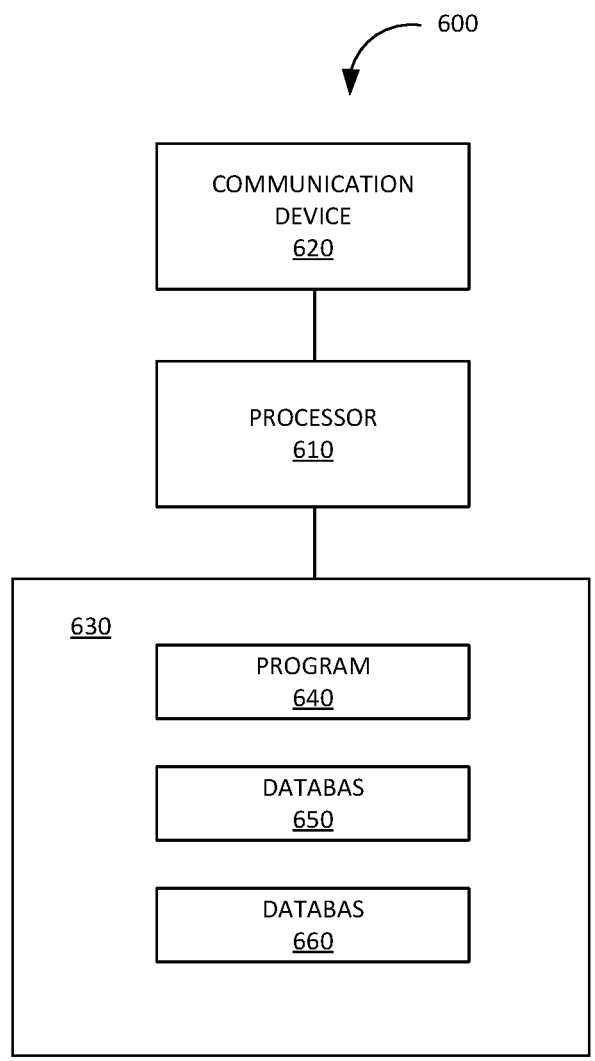
FIG. 6 illustrates an exemplary embodiment of an apparatus that may be used to implement aspects of the present disclosure including executable software.

In addition, FIG. 6 illustrates a controller 600 that may be utilized to implement some embodiments of the present invention. The controller may be included in one or more of the apparatus described above, such as the Revolver Server, and the Network Access Device. The controller 600 comprises a processor unit 610, such as one or more semiconductor based processors, coupled to a communication device 620 configured to communicate via a communication network (not shown in FIG. 6). The communication device 620 may be used to communicate, for example, with one or more online devices, such as a personal computer, laptop, or a handheld device.

The processor 610 is also in communication with a storage device 630. The storage device 630 may comprise any appropriate information storage device, including combinations of storage devices (e.g., cloud storage, mechanical disk drives, solid state disk drives), and/or semiconductor memory devices such as Random Access Memory (RAM) devices and Read Only Memory (ROM) devices.

The storage device 630 can store a software program 640 for controlling the processor 610. The processor 610 performs instructions of the software program 640, and thereby operates in accordance with the present invention. The processor 610 may also cause the communication device 620 to transmit information, including, in some instances, control commands to operate apparatus to implement the processes described above. The storage device 630 can additionally store related data in a database 650 and database 660, as needed. The data may include GPS, timestamp, resolution, general EXIF metadata, IPTC metadata, etc.

CONCLUSION

A number of embodiments of the present disclosure have been described. While this specification contains many specific implementation details, these should not be construed as limitations on the scope of any disclosures or of what may be claimed, but rather as descriptions of features specific to particular embodiments of the present disclosure. While embodiments of the present disclosure are described herein by way of example using several illustrative drawings, those skilled in the art will recognize the present disclosure is not limited to the embodiments or drawings described. It should be understood the drawings and the detailed description thereto are not intended to limit the present disclosure to the form disclosed, but to the contrary, the present disclosure is to cover all modification, equivalents and alternatives falling within the spirit and scope of embodiments of the present disclosure as defined by the appended claims.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted the terms "comprising", "including", and "having" can be used interchangeably.

Certain features that are described in this specification in the context of separate embodiments can also be implemented in combination in a single embodiment. Conversely, various features that are described in the context of a single embodiment can also be implemented in combination in multiple embodiments separately or in any suitable subcombination.

Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while method steps may be depicted in the drawings in a particular order, this should not be understood as requiring that such operations be performed in the particular order shown or in a sequential order, or that all illustrated operations be performed, to achieve desirable results.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

In certain implementations, multitasking and parallel processing may be advantageous. Nevertheless, it will be understood that various modifications may be made without departing from the spirit and scope of the claimed disclosure.

What is claimed is:

1. A method of interacting with a smart device to generate a Merchandise item including a selected image, the method comprising:
   displaying a collection of images on the smart device;
   based upon a user interaction selecting an image with a user interactive interface, associate a first set of Cartesian Coordinates associated with the selected image;
   associating a Merchandise item with a second set of Cartesian Coordinates;
   entering a user choice of the second set of Cartesian Coordinates to specify the Merchandise item;
   designating a third set of Cartesian Coordinates to be associated with a placement position of the selected image upon the Merchandise item;
   transmitting to a fulfillment shipper via Internet protocol from the first user device a digital representation of a user order comprising the selected image placed upon the Merchandise item, a digital description of the Merchandise item and a location on the Merchandise item for locating the digital representation of the selected image;
   determining that the first user has permission to create Merchandise based on the selected image;
   in response to determining that the first user has permission to create Merchandise, determining that at least a second user, who has permission to create Merchandise based on at least one second user image for which the first user does not have permission to create Merchandise, has given a server operator a permission to create Merchandise based on the at least one second user image;
   prompting the at least a second user on a second user device, based upon a determination that neither the first user nor the server operator has permission to create Merchandise based on the at least one second user image, to grant the first user the permission to create Merchandise based on the at least one second user image; and
   deleting the user order based upon a determination that: (i) neither the first user nor (ii) the server operator has permission to create Merchandise based on the selected image, (iii) nor has the second user given the first user permission to create Merchandise based on the at least one second user image.

2. The method of claim 1, wherein the method additionally comprises the step of prompting the first user to alter the selected image based on a chosen set of Cartesian Coordinates associated with the selected image, and additionally transmitting metadata to the fulfillment shipper corresponding to the first user's alterations.

3. The method of claim 1, wherein the method additionally comprises the step of adding visual indications of selection to the user selection of the selected image based on a chosen set of Cartesian Coordinates of the image.

4. The method of claim 1, wherein the method additionally comprises the steps of:
   determining whether the first user has permission to create Merchandise based on the selected image; and
   deleting the user order based upon a determination that the first user does not have permission to create Merchandise based on the selected image.

5. The method of claim 1, wherein the method additionally comprises the steps of:
   determining whether the first user has permission to create Merchandise based on the selected image;
   determining whether at least a second user, who has permission to create Merchandise based on at least one second user image for which the first user does not have permission to create Merchandise, has given a server operator a permission to create Merchandise based on the at least one second user image; and
   deleting the user order based upon a determination that neither the first user nor the server operator has permission to create Merchandise based on at least one second user image.

6. The method of claim 4, wherein the deleting of the user order further comprises prompting the first user to remove from the user order any images for which he does not have permission to create Merchandise, and the method further comprises the step of: upon a determination that the first user has removed all images for which the first user does not have permission to create Merchandise, the user order is not deleted.

7. The method of claim 5, wherein the deleting of the user order further comprises prompting the first user to remove from the user order any images for which he does not have permission to create Merchandise, and the method further comprises the step of: upon a determination that the first user has removed all images for which he does not have permission to create Merchandise, the user order is not deleted.

8. The method of claim 1, wherein the deleting of the user order further comprises prompting the first user to remove from the user order any images for which he does not have permission to create Merchandise, and the method further comprises the step of: upon a determination that the first user has removed all images for which he does not have permission to create Merchandise, the user order is not deleted.

9. An automated apparatus for facilitating easy Merchandise generation based upon a selection of images, the apparatus comprising:
   a computer server in logical connection with a digital communications network and configured to be accessed by a network access device via the digital communications network; and
   executable software stored on the computer server and executable on demand by a host processor, the software operative with the computer server to cause the computer server to:
   display a collection of images on a smart device, based upon a user interaction selecting an image with a user interactive interface, associate a first set of Cartesian Coordinates associated with the selected image, associate a Merchandise item with a second set of Cartesian Coordinates, enter a user choice of the second set of Cartesian Coordinates to specify the Merchandise item, designate a third set of Cartesian Coordinates to be associated with a placement position of the selected image upon the Merchandise item, transmit to a fulfillment shipper via Internet protocol from the first user device a digital representation of a user order comprising the selected image placed upon the Merchandise item, a digital description of the Merchandise item and a location on the Merchandise item for locating the digital representation of the selected image, determine that the first user has permission to create Merchandise based on the selected image, in response to determining that the first user has permission to create Merchandise, determine that at least a second user, who has permission to create Merchandise based on at least one second user image for which the first user does not have permission to create Merchandise, has given a server operator a permission to create Merchandise based on the at least one second user image, prompt the at least a second user on a second user device, based upon a determination that neither the first user nor the server operator has permission to create Merchandise based on the at least one second user image, to grant the first user the permission to create Merchandise based on the at least one second user image, and delete the user order based upon a determination that: (i) neither the first user nor (ii) the server operator has permission to create Merchandise based on the selected image, (iii) nor has the second user given the first user permission to create Merchandise based on the at least one second user image.

* * * * *